(12) United States Patent
Sieloff

(10) Patent No.: US 12,491,728 B1
(45) Date of Patent: Dec. 9, 2025

(54) SKULL MOUNTING DEVICE

(71) Applicant: Kit Keystone Media LLC, Tucson, AZ (US)

(72) Inventor: Debra Sieloff, Oro Valley, AZ (US)

(73) Assignee: Kit Keystone Media LLC, Tucson, AZ (US)

( * ) Notice: Subject to any disclaimer, the term of this patent is extended or adjusted under 35 U.S.C. 154(b) by 648 days.

(21) Appl. No.: 17/979,055

(22) Filed: Nov. 2, 2022

(51) Int. Cl.
*B44C 5/02* (2006.01)

(52) U.S. Cl.
CPC ..................... *B44C 5/02* (2013.01)

(58) Field of Classification Search
CPC ................. B44C 5/02; G09B 23/36
USPC ..................... 2/206; 119/836, 837
See application file for complete search history.

(56) References Cited

U.S. PATENT DOCUMENTS

| | | | | |
|---|---|---|---|---|
| 692,188 | A * | 1/1902 | Ford | A01K 15/006 119/837 |
| 2,040,410 | A * | 5/1936 | Sacker | A01K 15/02 119/837 |
| 2,574,222 | A * | 11/1951 | Mueller | A01K 15/006 119/837 |
| 2014/0209768 | A1* | 7/2014 | Maria | B44C 5/02 248/222.14 |

* cited by examiner

*Primary Examiner* — Dmitry Suhol
*Assistant Examiner* — Julie Grace Dosher
(74) *Attorney, Agent, or Firm* — Joseph E. Maenner; Petock & Petock LLC

(57) ABSTRACT

The present invention provides a skull mounting device having a central portion and a support strap extending from a first side of the central portion. The first support strap has a first free end. A second support strap extends from a second side of the central portion. The second support strap has a second free end. A top portion extends upwardly from the central portion. The top portion has a first sling connection point configured to connect to the first free end and a second sling connection point configured to connect to the second free end. A lower portion has a first nose support strap from the first side of the central portion. The first nose support strap has a first nose end. A second nose support strap extends in a direction opposite from the first nose support strap. The second nose support strap has a second nose end.

13 Claims, 2 Drawing Sheets

SKULL MOUNTING DEVICE

BACKGROUND OF THE INVENTION

Field of the Invention

The invention relates to a device for mounting skulls with or without horns or antlers from a game animal.

Description of the Related Art

Big game skulls with or without horns or antlers are often mounted for display to commemorate a hunt, display a species, preserve the skull (for conservation study) or show off a hunter's hunting prowess. One drawback to mounting skulls with or without horns or antlers for display is that a preservation activity limits the mounting to a display box and mounting is done via hooks or attachments to the skull of the animal and that typically results in partial or complete destruction of the skull due to damage that can occur in the mounting process, drilling, adhering, or manipulating the skull to facilitate mounting.

It would be beneficial to provide a mounting system that allows the skull with or without horns or antlers of a big game animal to be mounted without destroying or altering the skull. This is especially true when scientists attempt to take measurements for data collection or records of species in an area and are unable to collect accurate data because of damage.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a skull with or without horns or antler sling-like mounting device comprising a central portion starting at the nasal area of the skull and extending toward the top of the skull along a longitudinal centerline, and can extend over the skull and mounted to a base as a first point of mounting, then using three separate support straps to secure the skull, laterally to the base, to secure and support the skull with or without horn or antler weight. To achieve lateral stability and distribute the mounting weight points across multiple points of the skull, there are two lateral support straps that fit across the top of the skull, typically where a antler or horn would be located that cradle and secure the skull in position within the mounting system. There is a first antler or horn strap extending from a first side of the central portion of the mounting device, away from the centerline. The first antler or horn support strap has a first free end. A second antler or horn support strap extends from a second side of the central portion, away from the centerline in a direction opposite from the first antler or horn support strap. The second antler or horn support strap has a second free end. A top portion extends upwardly from the central portion along the centerline. The top portion has a first antler tie or sling connection point configured to connect to the first free end and a second antler tie or sling connection point configured to connect to the second free end. A lower portion extends downwardly from the central portion along the centerline. The lower portion has a first nose support strap from the first side of the central portion, away from the centerline. The first nose support strap has a first nose end. The lower portion also has a second nose support strap extending from the second side of the central portion, away from the centerline in a direction opposite from the first nose support strap. The second nose support strap has a second nose end. Each nose strap is fastened to the mounting base to secure and support the skull with or without horns or antlers.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
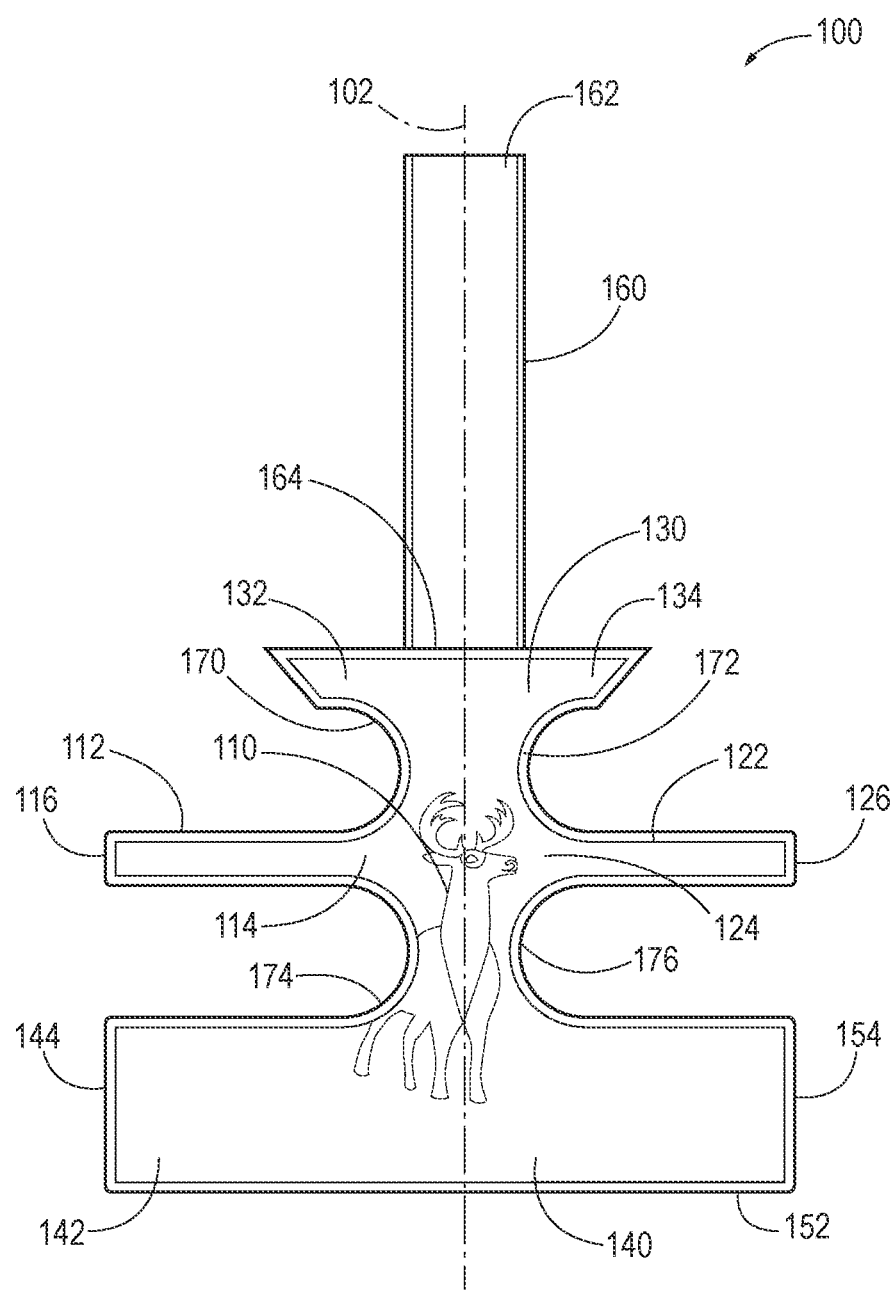
FIG. 1 is a top plan view of a skull with or without horn or antler mounting device according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Figure 2:
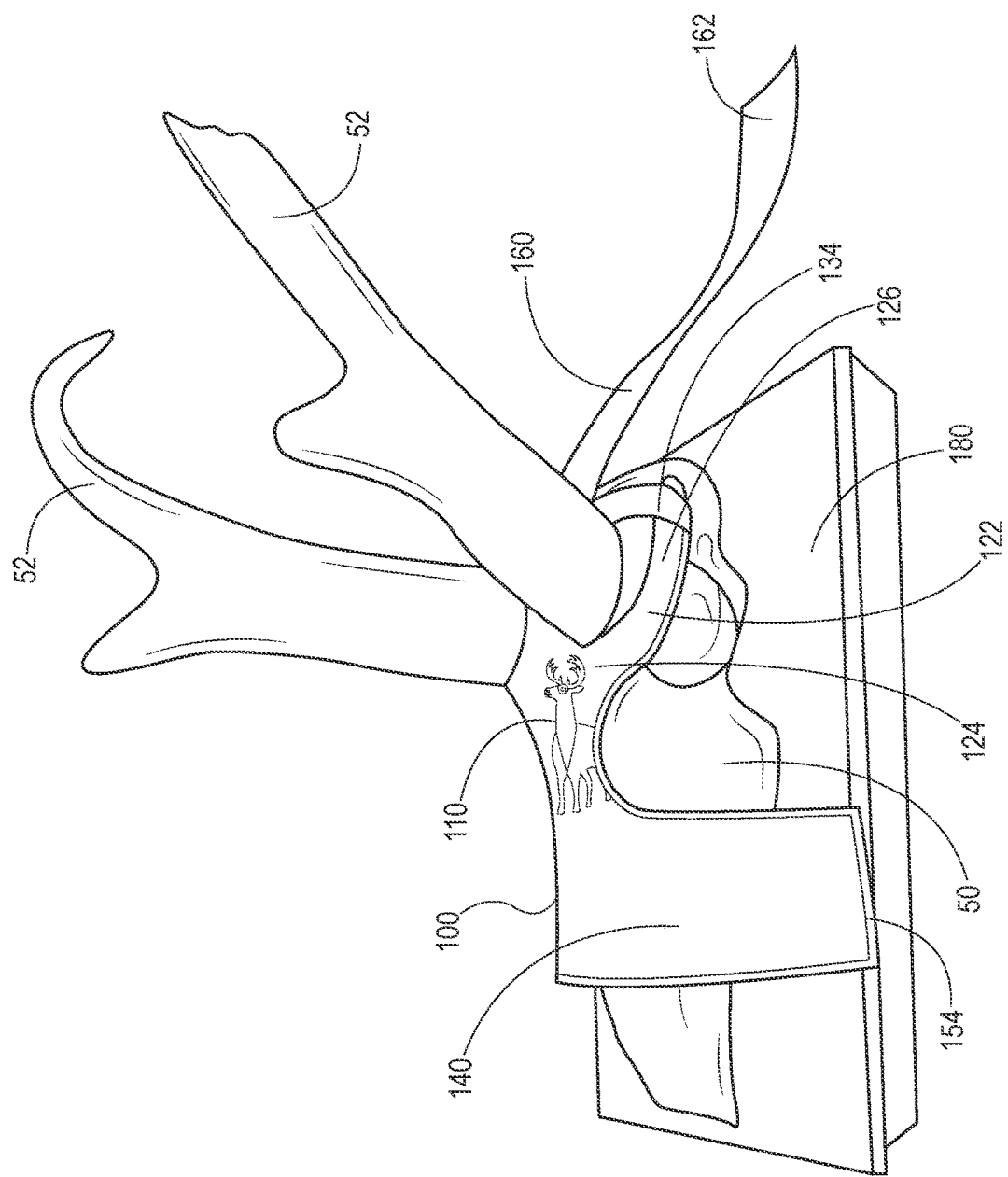
FIG. 2 is a side perspective view of the mounting device of FIG. 1 used to mount a big game skull and horns or antlers on to a base.

Referring to FIG. 1, a skull with or without horn or antler mounting device 100 according to an exemplary embodiment of the present invention is shown. FIG. 2 shows device 100 used with a big game skull 50 on which antlers or horns 52 are attached. While skull 50 can include antlers, horn, or neither, for sake of simplicity, skull 50 will be described and claimed herein as having antlers 52. Skull 50 is mounted on a base 180, such as a wooden plank.

Device 100 includes a moldable or flexible material, such as, for example, leather, that is placed over skull 50 and around antlers 52 and then secured to base 180, such as with tacks, nails, or other known securing mechanism.

Device 100 includes a central portion 110 extending along a longitudinal centerline 102, with a first support strap 112 extending from a first side 114 of the central portion 110, away from the centerline 102. The first support strap 112 has a first free end 116.

A second support strap 122 extends from a second side 124 of the central portion 110, away from the centerline 102 in a direction opposite from the first support strap 112. The second support strap 122 has a second free end 126.

A top portion 130 extends upwardly from the central portion 110 along the centerline 102. The top portion 130 has a first sling connection point 132 configured to connect to the first free end 116 and a second sling connection point 134 configured to connect to the second free end 126.

A lower portion 140 extends downwardly from the central portion 110 along the centerline 102. The lower portion 140 has a first nose support strap 142 extending from the first side 114 of the central portion 110, away from the centerline 102. The first nose support strap 142 has a first nose end 144. Similarly, a second nose support strap 152 extend from the second side 124 of the central portion 110, away from the centerline 102 in a direction opposite from the first nose support strap 142. The second nose support strap 152 has a second nose end 154. As shown in FIG. 1, the first support strap 112 and the first nose support strap 142 extend parallel to each other, as do the second support strap 122 and the second nose support strap 152.

An optional top support strap 160 can extend upwardly from the top portion 130 along the centerline 102. Top strap 160 has a mount end 162 and a top end 164 configured to be attached to the top portion 130 between the first sling connection point 132 and the second sling connection point 134.

In an exemplary embodiment of device 100, the central portion 110, the first strap 112, the second strap 122, the top portion 130, and the lower portion 140 work together as a single piece of material to support the skull 50 in a sling-like fashion.

Optionally, as further shown in FIG. 1, a curved portion 170 between first sling connection point 132 and first support strap 112 can have a constant radius of curvature to address skull ocular areas, such as, for example, about 2.25 inches. Similarly, a curved portion 172 between second sling connection point 134 and second support strap 122 can have a constant radius of curvature, such as, for example, about 2.25 inches.

Also optionally, a curved portion 174 between first support strap 112 and first nose support strap 142 can have a constant radius of curvature, such as, for example, about 2.25 inches. Similarly, a curved portion 176 between second support strap 122 and second nose support strap 152 can have a constant radius of curvature, such as, for example, about 2.25 inches.

Those skilled in the art, however will recognize that the radii or curvature can differ depending on the type and size of skull 50 and the presence or type of antlers or horns 52 that are being mounted.

To mount skull 50 and antlers 52 onto a base 180 using device 100, skull 50 is placed on base 180 such that the antlers 52 extend away from the base 180. It is desired to center skull 50 on base 180 as closely as possible. Next, the device 100 is placed onto the skull 50 such that the top portion 130 is above the antlers 52 and the central portion 110 conforms to at least a portion of skull 50.

Next, when using top strap 160, wrap the top strap 160 under the skull 50 and mark on the top strap 160 where to tack top strap 160 onto base 180. Remove the skull 50 from base 180 and tack the mount end 162 of top end 160 to base 180 secure the mount end 162 of the top strap 160 to the base 180.

Next, replace the skull 50 onto base 180 and position support straps 112, 122, 132, 134 over skull 50 and around antlers 52. Secure the first support strap 112 to the first sling connection point 132 and the second support strap 122 to the second sling connection point 134. Finally, tack the first nose support strap 142 and the second nose support strap 152 each to base 180. Tack the support straps 142, 152 close to the skull 50 to give the skull 50 snug support.

It will be further understood that various changes in the details, materials, and arrangements of the parts which have been described and illustrated in order to explain the nature of this invention may be made by those skilled in the art without departing from the scope of the invention as expressed in the following claims.

I claim:
1. A skull mounting device comprising:
   a central portion extending along a longitudinal centerline, the central portion having a first side and an opposing second side;
   a first support strap extending from the first side of the central portion, away from the centerline, the first support strap having a first free end;
   a second support strap extending from a second side of the central portion, away from the centerline in a direction opposite from the first support strap, the second support strap having a second free end;

a top portion extending upwardly from the central portion along the centerline, wherein the top portion has:
   a first sling connection point configured to connect to the first free end; and
   a second sling connection point configured to connect to the second free end;

a lower portion extending downwardly from the central portion along the centerline, wherein the lower portion has:
   a first nose support strap extending from the first side of the central portion, away from the centerline, the first nose support strap having a first nose end; and
   a second nose support strap extending from the second side of the central portion, away from the centerline in a direction opposite from the first nose support strap, the second nose support strap having a second nose end; and a base attachable to the first nose support strap and to the second nose support strap, wherein an animal skull is supported on a front surface of the base by the first nose support strap and the second nose support strap and wherein a rear surface of the base is mountable to a wall, the base further comprising a width greater than the width of the animal skull.

2. The skull mounting device according to claim 1, further comprising a top skull support strap extending upwardly from the top portion along the centerline.

3. The skull mounting device according to claim 2, wherein the top skull support strap has a mount end and a top end configured to be attached to the top portion between the first sling connection point and the second sling connection point.

4. The skull mounting device according to claim 1, wherein the central portion, the first support strap, the second support strap, the top portion, and the lower portion are assembled as a single apparatus.

5. The skull mounting device according to claim 4, wherein the single apparatus comprises a moldable material.

6. The skull mounting device according to claim 4, wherein the single apparatus comprises the ability to incorporate a graphic design therein.

7. The skull mounting device according to claim 1, wherein the first support strap extends parallel to the first nose support strap.

8. A method of mounting a skull with antlers onto a base comprising the steps of:
   (a) providing a skull mounting device comprising:
      a central portion extending along a longitudinal centerline, the central portion having a first side and an opposing second side;
      a first support strap extending from the first side of the central portion, away from the centerline, the first support strap having a first free end;
      a second support strap extending from a second side of the central portion, away from the centerline in a direction opposite from the first support strap, the second support strap having a second free end;
      a top portion extending upwardly from the central portion along the centerline, wherein the top portion has:
         a first sling connection point configured to connect to the first free end; and
         a second sling connection point configured to connect to the second free end;
      a top skull support strap extending upwardly from the top portion along the centerline; and
      a lower portion extending downwardly form the central portion along the centerline, wherein the lower portion has:
         a first nose support strap extending from the first side of the central portion, away from the centerline, the first nose support strap having a first nose end; and
         a second nose support strap extending from the second side of the central portion, away from the centerline in a direction opposite from the first nose support strap, the second nose support strap having a second nose end;

wherein the top skull support strap has a mount end and a top end configured to be attached to the top portion between the first sling connection point and the second sling connection point;
   (b) placing the skull onto the base such that the skull extends away from the base;
   (c) placing the device onto the skull such that the top portion is above the top of the skull and the central portion conforms to at least a portion of the skull;
   (d) attaching the top end of the top skull support strap to the base;
   (e) placing the first support strap and the first sling connection point around the skull to support the first of the antlers and securing the first support strap to the first sling connection point; and
   (f) securing the first nose support strap end to the base.

9. The method according to claim 8, further comprising, after step €, the step of placing the second support strap and the second sling connection point around the skull to support the second of the antlers and securing the second support strap to the second sling connection point.

10. The method according to claim 8, further comprising, after step (e), the step of securing the second nose strap end to the base.

11. The method according to claim 8, further comprising, after step (c) and before step (d), marking a location to attach the top end of the top skull support strap onto the base on the top support strap.

12. The method according to claim 11, further comprising, after marking the location and before step (d), removing the skull from the base.

13. The method according to claim 12, further comprising, after step (d) and before step (e) replacing the skull onto the base.

* * * * *